United States Patent
Jung et al.

(10) Patent No.: US 10,127,703 B2
(45) Date of Patent: Nov. 13, 2018

(54) IMAGE OUTPUT METHOD AND ELECTRONIC DEVICE FOR SUPPORTING THE SAME

(71) Applicant: Samsung Electronics Co., Ltd, Gyeonggi-do (KR)

(72) Inventors: Young Il Jung, Seoul (KR); Kwang Jeung Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 56 days.

(21) Appl. No.: 15/283,245

(22) Filed: Sep. 30, 2016

(65) Prior Publication Data

US 2017/0098321 A1 Apr. 6, 2017

(30) Foreign Application Priority Data

Oct. 2, 2015 (KR) .......................... 10-2015-0139403

(51) Int. Cl.
| | |
|---|---|
| *H04N 21/44* | (2011.01) |
| *G06T 11/60* | (2006.01) |
| *H04L 29/08* | (2006.01) |
| *H04N 21/414* | (2011.01) |
| *H04N 21/422* | (2011.01) |

(Continued)

(52) U.S. Cl.
CPC .............. *G06T 11/60* (2013.01); *H04L 67/02* (2013.01); *H04L 67/06* (2013.01); *H04N 21/41407* (2013.01); *H04N 21/42224* (2013.01); *H04N 21/44008* (2013.01); *H04N 21/4725* (2013.01); *H04N 21/4882* (2013.01); *H04N 21/4884* (2013.01); *H04N 21/858* (2013.01); *G06T 2207/20221* (2013.01)

(58) Field of Classification Search
CPC ........... G06T 11/60; G06T 2207/20221; H04L 67/02; H04L 67/06; H04N 21/4884; H04N 21/4882; H04N 21/44008; H04N 21/42224; H04N 21/858; H04N 21/41407
See application file for complete search history.

(56) References Cited

U.S. PATENT DOCUMENTS

| | | |
|---|---|---|
| 6,876,396 B2 | 4/2005 | Mizobuchi et al. |
| 8,312,497 B2 | 11/2012 | Pearson et al. |

(Continued)

FOREIGN PATENT DOCUMENTS

| | | |
|---|---|---|
| KR | 10-2010-0005433 | 1/2010 |
| KR | 20120073083 A | 7/2012 |

(Continued)

OTHER PUBLICATIONS

Foreign Communication From a Related Counterpart Application, PCT Application No. PCT/KR2016/011012, International Search Report and Written Opinion dated Jan. 12, 2017, 12 pages.

(Continued)

*Primary Examiner* — Siamak Harandi

(57) ABSTRACT

One or more embodiments of this disclosure provide an image output method. The image output method includes receiving image data for a plurality of image frames and caption data linked with the plurality of image frames. The method also includes outputting parsing the caption data to extract link information according to a data type from the caption data. The method also includes outputting a connection object or a list, for verifying the link information while the plurality of image frames are output on a display of the electronic device.

20 Claims, 10 Drawing Sheets

(51) Int. Cl.
  *H04N 21/4725*  (2011.01)
  *H04N 21/488*  (2011.01)
  *H04N 21/858*  (2011.01)

(56) References Cited

U.S. PATENT DOCUMENTS

| | | |
|---|---|---|
| 8,739,237 B2 | 5/2014 | Pearson et al. |
| 2002/0149699 A1 | 10/2002 | Mizobuchi et al. |
| 2007/0234397 A1 | 10/2007 | Pearson et al. |
| 2009/0190031 A1 | 7/2009 | Guihot |
| 2013/0007827 A1 | 1/2013 | Adam et al. |
| 2013/0050578 A1 | 2/2013 | Lee et al. |
| 2013/0055329 A1 | 2/2013 | Pearson et al. |
| 2014/0189478 A1 | 7/2014 | Bazaz |
| 2014/0237532 A1 | 8/2014 | Pearson et al. |
| 2014/0327825 A1 | 11/2014 | Eyer |
| 2015/0256904 A1 | 9/2015 | Chi et al. |

FOREIGN PATENT DOCUMENTS

| | | |
|---|---|---|
| KR | 10-2013-0004071 | 1/2013 |
| KR | 10-2013-0129664 | 11/2013 |
| KR | 10-1420156 B1 | 7/2014 |

OTHER PUBLICATIONS

Communication from foreign patent office in a counterpart foreign application, European Patent Office, "Supplementary European Search Report," Application No. EP 16852117.7, dated May 14, 2018, 7 pages.

IMAGE OUTPUT METHOD AND ELECTRONIC DEVICE FOR SUPPORTING THE SAME

CROSS-REFERENCE TO RELATED APPLICATION(S) AND CLAIM OF PRIORITY

The present application is related to and claims the benefit under 35 U.S.C. § 119(a) of a Korean patent application filed on Oct. 2, 2015 in the Korean Intellectual Property Office and assigned Serial number 10-2015-0139403, the entire disclosure of which is hereby incorporated by reference.

TECHNICAL FIELD

The present disclosure relates to a method for receiving image data from an external device and outputting an image based on the received image data via an electronic device and the electronic device for supporting the same.

BACKGROUND

An electronic device such as a smartphone and a tablet personal computer (PC) may perform a variety of functions, for example, data communication, sound source playback, video playback, and the like. The electronic device may receive image data from an external device over a network and may output an image based on the received image data. The electronic device may receive and reproduce image data in a download mode or a streaming mode.

If providing additional information using a caption, the electronic device according to the related art may extract a keyword from a previously stored caption file and may provide the additional information associated with the keyword. Various types of keywords may be stored in an external server. If necessary, the electronic device may operate in such a manner to refer to the keyword stored in the server. It is difficult for the electronic device of the related art to perform all computation associated with extracting a keyword and providing additional information. Provided additional information may also be provided on a limited basis in a predetermined form.

SUMMARY

To address the above-discussed deficiencies, it is a primary object to provide an image output method for extracting link information from caption data provided together with real-time broadcast data (or streaming image data) and outputting the extracted link information in an electronic device and the electronic device for supporting the same.

An embodiment of this disclosure provides an image output method. The image output method includes receiving image data for a plurality of image frames and caption data linked with the plurality of image frames. The method also includes outputting parsing the caption data to extract link information according to a data type from the caption data. The method also includes outputting a connection object or a list, for verifying the link information while the plurality of image frames are output on a display of the electronic device.

Another embodiment of this disclosure provides an electronic device. The electronic device includes a memory, a communication interface configured to, a display, and a processor configured to electrically connect with the memory, the communication interface, and the display. The display is configured to output an image under control of the processor. The communication unit is configured to perform data communication with an external device, and receive image data for a plurality of image frames and caption data linked with the plurality of image frames. The processor is configured to parse the caption data and extract link information according to a data type from the caption data, and output a connection object or a list for verifying the link information, while the plurality of image frames are output on the display.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
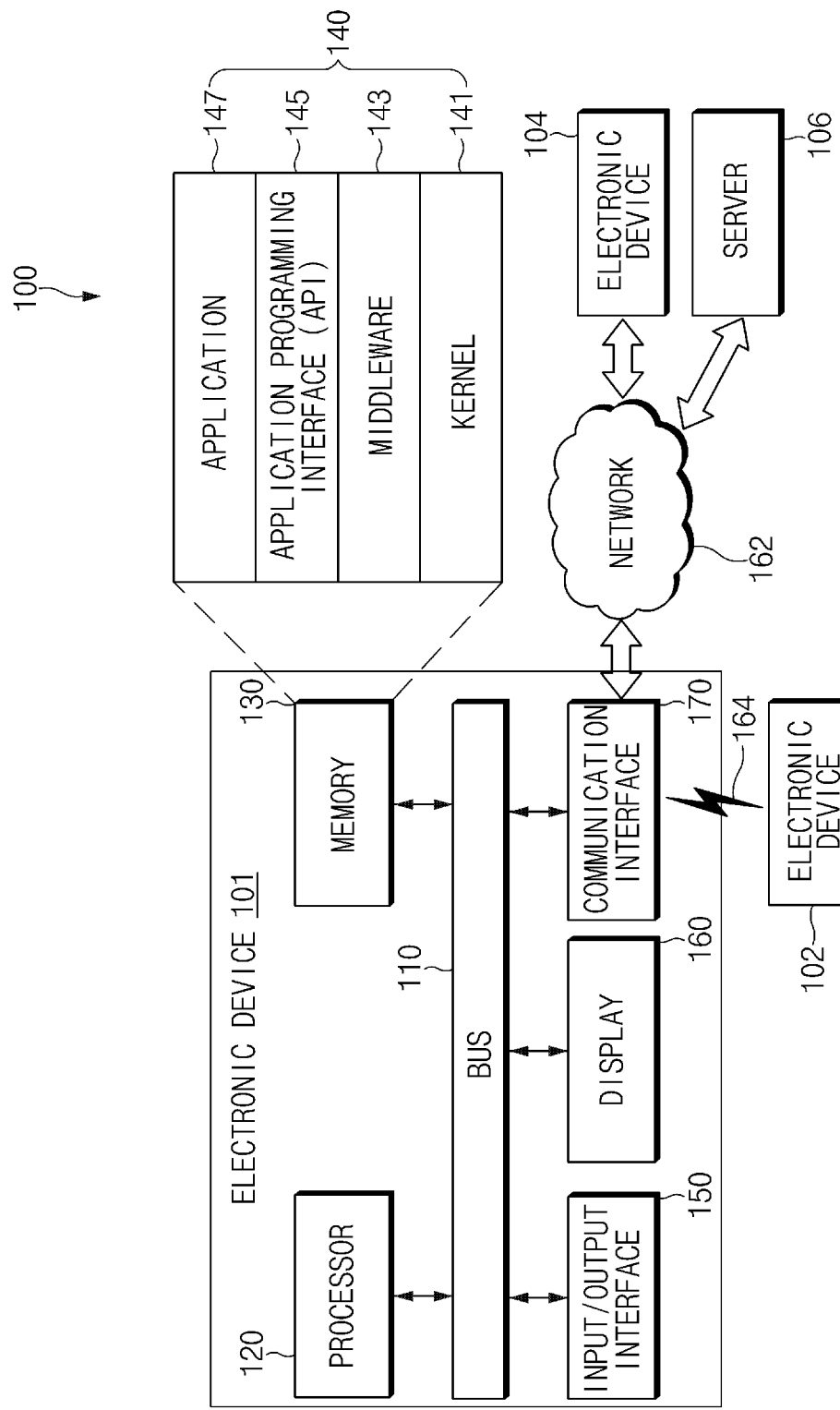
FIG. 1 illustrates a block diagram of a configuration of an electronic device in a network environment according to various embodiments.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device or method.

Hereinafter, various embodiments of the present disclosure will be described with reference to the accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the disclosure disclosed herein, the expressions "have", "may have", "include" and "comprise", or "may include" and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the example (1) where at least one A is included, the example (2) where at least one B is included, or the example (3) where both of at least one A and at least one B are included.

The terms, such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), the element can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. CPU, for example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs that are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some example embodiments, even if terms are terms that are defined in the specification, the terms may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. According to various embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

In some embodiments of the present disclosure, the electronic device may be one of home appliances. The home appliances may include, for example, at least one of a digital video disk (DVD) player, an audio, a refrigerator, an air conditioner, a cleaner, an oven, a microwave oven, a washing machine, an air cleaner, a set-top box, a home automation control panel, a security control panel, a TV box (for example, Samsung HomeSync™, Apple TV™, or Google TV™), a game console (for example, Xbox™ or PlayStation™), an electronic dictionary, an electronic key, a camcorder, or an electronic panel.

In another embodiment of the present disclosure, the electronic device may include at least one of various medical devices (for example, various portable medical measurement devices (a blood glucose meter, a heart rate measuring device, a blood pressure measuring device, and a body temperature measuring device), a magnetic resonance angiography (MRA), a magnetic resonance imaging (MM) device, a computed tomography (CT) device, a photographing device, and an ultrasonic device), a navigation system, a global navigation satellite system (GNSS), an event data recorder (EDR), a flight data recorder (FDR), a vehicular infotainment device, electronic devices for vessels (for example, a navigation device for vessels and a gyro compass), avionics, a security device, a vehicular head unit, an industrial or home robot, an automatic teller's machine (ATM) of a financial company, a point of sales (POS) of a store, or an internet of things (for example, a bulb, various sensors, an electricity or gas meter, a spring cooler device, a fire alarm device, a thermostat, an electric pole, a toaster, a sporting apparatus, a hot water tank, a heater, and a boiler).

According to some embodiments of the present disclosure, the electronic device may include at least one of a furniture or a part of a building/structure, an electronic board, an electronic signature receiving device, a projector, or various measurement devices (for example, a water service, electricity, gas, or electric wave measuring device). In various embodiments of the present disclosure, the electronic device may be one or a combination of the aforementioned devices. The electronic device according to some embodiments of the present disclosure may be a flexible electronic device. Further, the electronic device according to an embodiment of the present disclosure is not limited to the aforementioned devices, but may include new electronic devices produced due to the development of technologies.

Hereinafter, electronic devices according to an embodiment of the present disclosure will be described with reference to the accompanying drawings. The term "user" used herein may refer to a person who uses an electronic device or may refer to a device (for example, an artificial electronic device) that uses an electronic device.

FIG. 1 illustrates a block diagram of a configuration of an electronic device 101 in a network environment 100 according to various embodiments.

Referring to FIG. 1, there is illustrated an electronic device 101 in a network environment 100 according to various embodiments. The electronic device 101 may include a bus 110, a processor 120, a memory 130, an input/output (I/O) interface 150, a display 160, and a communication interface 170. According to an embodiment, the electronic device 101 may not include at least one of the above-described elements or may further include other element(s).

For example, the bus 110 may interconnect the above-described elements 120 to 170 and may include a circuit for conveying communications (e.g., a control message and/or data) among the above-described elements.

The processor 120 (e.g., the processor 110 of FIG. 1) may include one or more of a central processing unit (CPU), an application processor (AP), or a communication processor (CP). The processor 120 may perform, for example, data processing or an operation associated with control and/or communication of at least one other element(s) of the electronic device 101.

According to various embodiments, a processor 120 may output an image on a display 160. The processor 120 may output the image based on data (hereinafter referred to as "image data") for outputting an image provided from an external device (e.g., an electronic device 102, an electronic device 104, or a server 106). In various embodiments, the processor 120 may output a caption based on caption data provided together with the image data from the external device (e.g., the electronic device 102, the electronic device 104, or the server 106). The caption data may include text information that configures a caption.

According to various embodiments, the processor 120 may parse a caption (or caption data) and may extract link information according to a specified data type (e.g., a uniform resource locator (URL) address pattern, a phone number pattern, an electronic mail (email) address pattern, and the like) from the caption (or the caption data). The processor 120 may output the extracted link information together with an image. A user of the electronic device 101 may quickly and simply verify currently output information (or recently passed information) through link information output together with a real-time broadcast. Additional information about a method of extracting and outputting link information may be provided with reference to FIGS. 2 to 9.

The memory 130 (e.g., the memory 160 of FIG. 1) may include a volatile and/or nonvolatile memory. For example, the memory 130 may store instructions or data associated with at least one other element(s) of the electronic device 101.

According to various embodiments, a memory 130 may store link information extracted by the processor 120. The memory 130 may list the extracted link information (e.g., may perform history listing of the extracted link information) in a specified order (e.g., in order of time). The memory 130 may provide a list of link information based on a request of the processor 120.

According to various embodiments, the memory 130 may include a buffer for storing link information. The buffer may store link information during a specified time. If the specified time elapses or if specified capacity is exceeded, the buffer may delete the stored link information.

In various embodiments, the memory 130 may store link information together with an image where a screen that displays the link information is captured. Subsequently, if the user selects the stored capture image through a corresponding application, related additional information may be displayed or a related application may be executed. Additional information about the capture image may be provided with reference to FIG. 7A.

According to an embodiment, the memory 130 may store software and/or a program 140. The program 140 may include, for example, a kernel 141, a middleware 143, an application programming interface (API) 145, and/or an application program (or "application") 147. At least a part of the kernel 141, the middleware 143, or the API 145 may be called an "operating system (OS)".

The kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the electronic device 101 so as to control or manage system resources.

The middleware 143 may perform a mediation role such that the API 145 or the application program 147 communicates with the kernel 141 to exchange data.

Furthermore, the middleware 143 may process one or more task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147. For example, the middleware 143 may process the one or more task requests according to the priority assigned to the at least one, which makes it possible to perform scheduling or load balancing on the one or more task requests.

The API 145 may be an interface through which the application 147 controls a function provided by the kernel 141 or the middleware 143, and may include, for example, at least one interface or function (e.g., an instruction) for a file control, a window control, image processing, a character control, or the like.

The I/O interface 150 may transmit an instruction or data, input from a user or another external device, to other element(s) of the electronic device 101. Furthermore, the I/O interface 150 may output an instruction or data, received from other element(s) of the electronic device 101, to a user or another external device.

The display 160 may include, for example, a liquid crystal display (LCD), a light-emitting diode (LED) display, an organic LED (OLED) display, or a microelectromechanical systems (MEMS) display, or an electronic paper display. The display 160 may display, for example, various kinds of content (e.g., a text, an image, a video, an icon, a symbol, and the like) to a user. The display 160 may include a touch screen and may receive, for example, a touch, gesture, proximity, or hovering input using an electronic pen or a portion of a user's body.

In various embodiments, the display 160 may output an image or a caption under control of the processor 120. In various embodiments, the display 160 may output a connection object (e.g., a link button, an icon, a link list, and the like). If the user selects the connection object displayed on the display 160, a list of link information extracted from a caption may be output or a related application may be executed.

According to various embodiments, the connection object may be output on a display of the external device (e.g., the electronic device 102) that operates with the electronic device 101. The user may view an image via the display 160 of the electronic device 101 and may verify link information associated with the image via the display of the external device (e.g., the electronic device 102), for example, a smart watch.

The communication interface 170 may establish communication between the electronic device 101 and an external device (e.g., a first external electronic device 102, a second external electronic device 104, or a server 106). For example, the communication interface 170 may be connected to a network 162 through wireless communication or wired communication to communicate with an external device (e.g., the second external electronic device 104 or the server 106).

According to various embodiments, a communication interface 170 may receive a packet including image data and caption data over a network 162 from the external device (e.g., the electronic device 104 or the server 106). The communication interface 170 may provide the received packet to the processor 120.

The wireless communication may include at least one of, for example, LTE (long-term evolution), LTE-A (LTE Advance), CDMA (Code Division Multiple Access), WCDMA (Wideband CDMA), UMTS (Universal Mobile Telecommunications System), WiBro (Wireless Broadband), or GSM (Global System for Mobile Communications), or the like, as cellular communication protocol. Furthermore, the wireless communication may include, for example, a local area network 164. The local area network 164 may include at least one of a wireless fidelity (Wi-Fi), a near field communication (NFC), or a global navigation satellite system (GNSS), or the like. The GNSS may include at least one of a global positioning system (GPS), a global navigation satellite system (Glonass), Beidou Navigation Satellite System (hereinafter referred to as "Beidou"), the European global satellite-based navigation system (Galileo), or the like. In this specification, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 162 may include at least one of telecommunications networks, for example, a computer network (e.g., LAN or WAN), an Internet, or a telephone network.

Each of the first and second external electronic devices 102 and 104 may be a device where the type is different from or the same as that of the electronic device 101. According to an embodiment, the server 106 may include a group of one or more servers. According to various embodiments, all or a portion of operations that the electronic device 101 will perform may be executed by another or plural electronic devices (e.g., the electronic devices 102 and 104 or the server 106). According to an embodiment, when the electronic device 101 executes any function or service automatically or in response to a request, the electronic device 101 may not perform the function or the service internally. Alternatively, the electronic device 101 may request at least a part of a function associated with the electronic device 101 at other device (e.g., the electronic device 102 or 104 or the server 106). The other electronic device (e.g., the electronic device 102 or 104 or the server 106) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

According to various embodiments, the electronic device 101 may output information associated with link information using a peripheral electronic device (e.g., the electronic device 102) that operates with the electronic device 101. For example, if the electronic device 101 operates with a smart watch, for example, if the electronic device 101 is in a Bluetooth connection with the smart watch, an image may be output on the display 160 of the electronic device 101 and link related information (e.g., a connection object, a link list, and the like) may be displayed on a display of the smart watch.

In an embodiment, if the electronic device 101 outputs a connection object (e.g., a link button, an icon, and the like), the processor 120 may generate a pop-up window for inquiring of the user about whether to output link related information via the electronic device 102 or may output link related information via the electronic device 102 based on pressure of a touch input of the user.

In another embodiment, the processor 120 may request the electronic device 102 to output a connection object or to execute an application associated with link information.

In various embodiments, the external device (e.g., the server 106) may be a device that provides a real-time streaming service. For example, the server 106 may classify one image file of the same attributes as a streaming file and may transmit the streaming file to the electronic device 101 based on a network transmission speed. The streaming file may be used to provide news, a drama, and the like through a real-time broadcast. Herein, some delays may occur based on a network speed, a computing speed of the electronic device 101, and the like.

The electronic device 101 may first receive and reproduce some of data of an image file by a real-time streaming mode and may receive and reproduce data of a subsequent interval while a partial interval is reproduced. The electronic device 101 may delete a streaming file, the reproduction of which is completed to secure a storage space of the memory 140.

If necessary, the electronic device 101 may output a caption together with an image. The caption may be extracted from caption data transmitted together with image data. The caption data may be data of a text format distinguished from the image data. The caption data may include information such as a caption, an output start time, an output end time, a location of the caption, and a size of the caption.

If there is link information (e.g., a URL address, a phone number, an email, and the like) included in a caption, the electronic device 101 may notify the user of the link information through a connection object such as a link button and an icon. The user may quickly and simply verify currently output information (or recently passed information) through link information output together with a real-time broadcast. Also, the electronic device 101 may provide a quick connection between the user and a broadcast service provider to help provide efficient information in real time to the user and to help provide an advertisement to him or her. Additional information about a method of extracting and outputting link information may be provided with reference to FIGS. 2 to 9.

Figure 2:
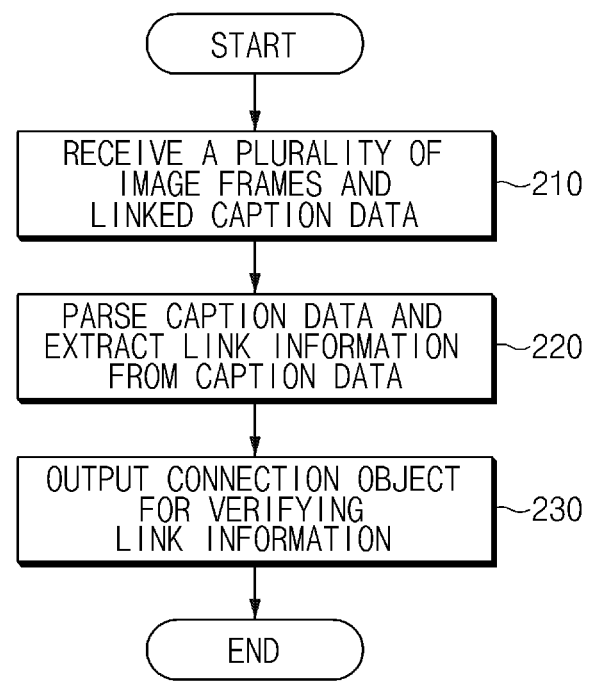
FIG. 2 illustrates an image output process according to various embodiments.

FIG. 2 illustrates an image output process according to various embodiments.

Referring to FIG. 2, in operation 210, a communication interface 170 of FIG. 1 may receive image data for a plurality of image frames and caption data linked with the plurality of image frames from an external device (e.g., an electronic device 104 or a server 106 of FIG. 1). The image data and the caption data may be received on a per-packet basis. In various embodiments, the plurality of image frames may configure the same one program (e.g., news, a drama, and the like) or part of one video file.

According to various embodiments, the plurality of image frames may be frames where all of captions of a text format included in the caption data are equally displayed. If the plurality of image frames is configured with a first frame to an Nth frame, a caption output on the first frame may be the same as all of captions output on the second frame to the Nth frame.

The caption data may include a caption displayed on the plurality of image frames and information about an output of the caption (e.g., an output start time, an output end time, a location of the caption, a size of the caption, and the like).

In operation 220, a processor 120 of FIG. 1 may parse the caption data and may extract link information according to a specified data type from the caption data. The specified data type may be syntax of a specified pattern for recognizing a URL address (e.g., www.OOOO.com), a phone number (e.g., 1234-1234-12345), an email address (e.g., OOOO@OOO.com), and the like. In various embodiments, the link information may be contact information such as a URL address, a phone number, and an email address.

The processor 120 may extract a portion, which is identical to the data type in the parsed caption, as the link information. The extracted link information may be stored in a memory 130 of FIG. 1. The processor 120 may list and store the extracted link information in a specified order (e.g., in order of time), for example may perform history listing of the extracted link information in a specified order (e.g., in order of time). In various embodiments, the link information may be stored in a temporary buffer that stores data during a specified time. The temporary buffer may store the link information during a specified time. If the specified time elapses or if specified capacity is exceeded, the temporary buffer may delete the stored link information.

The processor 120 may mutually link the extracted link information with a related application (or an application execution screen). For one example, if the extracted link information is a URL address, the processor 120 may link a browser app that accesses a corresponding URL address to the link information. For another example, if the extracted link information is a phone number, the processor 120 may link a calling screen of a call app or a message sending screen of a message app to the link information.

According to various embodiments, the processor 120 may combine additional information with the extracted link information. The additional information may be information that supplements the extracted link information. For one example, if the link information is the URL address 'www.samsung.com', the processor 120 may change the link information to 'http://www.samsung.com' by adding additional information 'http://' to the link information. For another example, if the link information is the phone number '123-1234', the processor 120 may change the link information to '02-123-1234' by adding an area number as additional information to the link information.

In operation 230, the processor 120 may output a connection object (e.g., a link button, an icon, a link list, and the like) for verifying the link information on at least part of a display 160 of FIG. 1. If a user of an electronic device 101 of FIG. 1 pushes the connection object, a list of the link information may be displayed. The list may be displayed to a specified size or less or may be output in the form of a transparent window not to interfere with viewing an image broadcasted in real time (refer to FIG. 4).

According to various embodiments, the processor 120 may directly display the link information in the form of text on the display 160, for example, may directly display a URL address and a phone number on a screen, and may output a shortcut icon associated with the link information. If the user selects the text or shortcut icon, a related application may be directly displayed (refer to FIG. 5).

According to various embodiments, if the user does not select the connection object during a specified time, the processor 120 may remove the connection object from a screen and may delete link information stored in the memory 160 or the temporary buffer.

According to various embodiments, the processor 120 may provide a setup screen of determining whether to display link information on a screen to the user. For example, the processor 120 may provide a button of turning on/off displaying link information in real time, in a setting of a video playback app or a broadcast streaming app.

According to various embodiments, if a caption is not output on a screen, the processor 120 may extract link information from the caption. If there is extracted link information, the processor 120 may output a connection object in a state where a caption is not output on a screen. For example, if the processor may receive caption data associated with image data, but if the user sets not to display a caption, the processor 120 may extract link information from a caption irrespective of outputting the caption on a screen. If there is extracted link information, the processor 120 may output a connection object on a screen to allow the user to select the connection object and to verify the link information if necessary.

According to various embodiments, an image output method performed in an electronic device may include receiving image data for a plurality of image frames and caption data linked with the plurality of image frames, parsing the caption data and extracting link information according to a data type from the caption data and outputting a connection object or a list for verifying the link information, while the plurality of image frames are output on a display of the electronic device.

According to an embodiment, the receiving of the image data and the caption data may include receiving image data for the plurality of image frames that configure a partial subsequent interval, in one image of the same attributes. According to another embodiment, the receiving of the image data and the caption data include receiving image data for a plurality of image frames that configure at least part of a streaming file for one image.

According to various embodiments, the receiving of the image data and the caption data include receiving a plurality of packets including the image data and the caption data and extracting the caption data from at least some of the plurality of packets.

According to various embodiments, the extracting of the link information may include storing the link information in a buffer that maintains stored data during a time. The extracting of the link information may include storing the link information in a memory of the electronic device and storing history including time information about the link information. The extracting of the link information may include extracting the link information based on a data type corresponding to at least one of a uniform resource locator (URL), a phone number, or an electronic mail (email).

According to various embodiments, the outputting of the connection object may include outputting text indicating the link information as the connection object. The outputting of the connection object may include outputting a link button or an icon for outputting a list of the extracted link information as the connection object. The outputting of the connection object may include outputting the connection object after an image frame among the plurality of image frames.

According to various embodiments, the outputting of the connection object may include outputting the connection object on at least one of the display of the electronic device or a display of an external device that operates with the electronic device.

According to various embodiments, the method may further include outputting a list of the link information on at least part of the display, if the connection object is selected. The outputting of the list of the link information may include executing an application associated with the link information, if link information included in the list is selected. The executing of the application may include continuing outputting an image by the plurality of image frames on a first region of the display and outputting an execution screen by the application on a second region of the display.

According to various embodiments, the extracting of the link information may include processing at least some of the plurality of image frames as an image and extracting text of a data type from the image and parsing the text and extracting the link information from the text.

Figure 3:
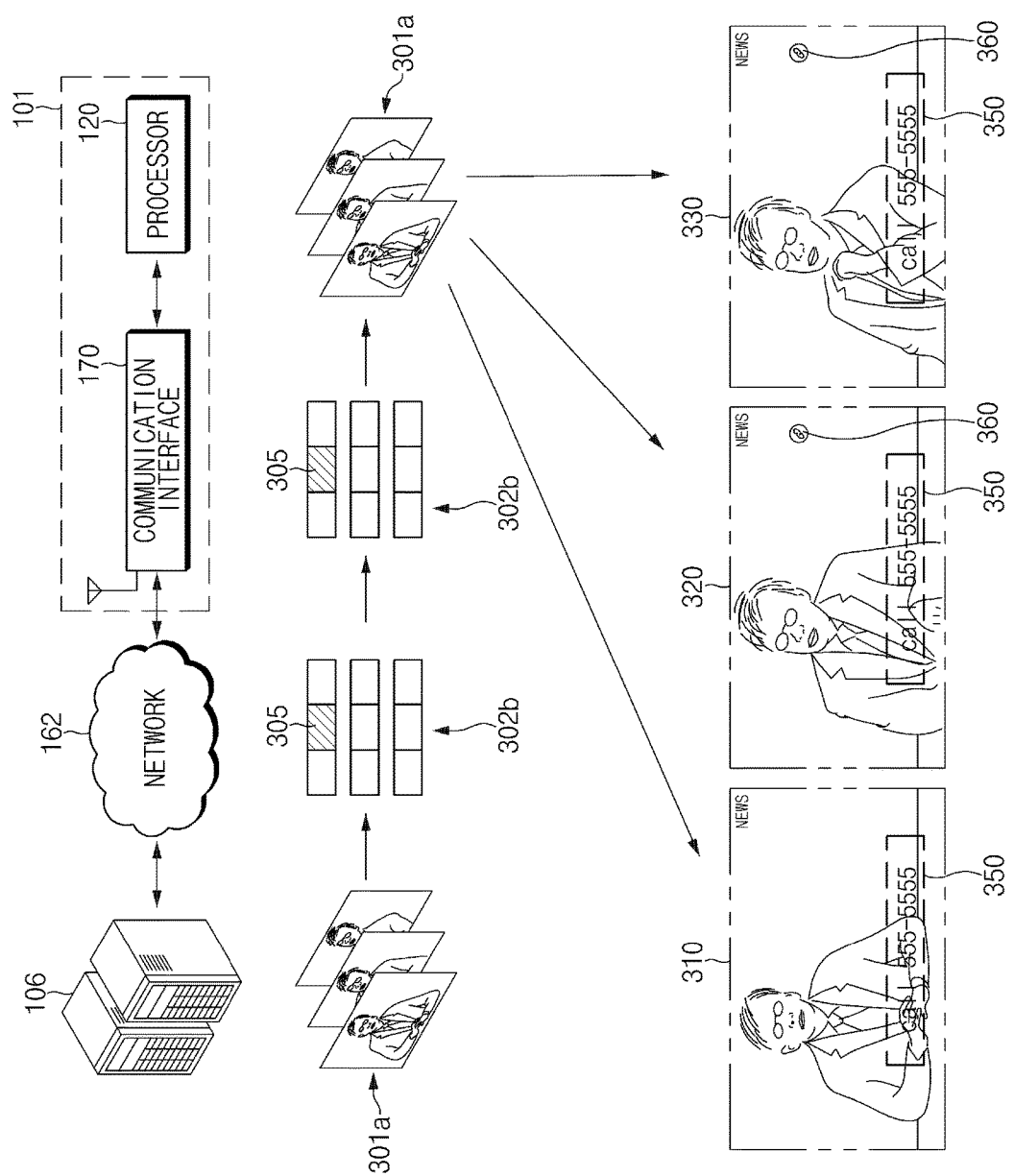
FIG. 3 illustrates a drawing showing a process of outputting image data and caption data according to various embodiments.

FIG. 3 illustrates a drawing showing a process of outputting image data and caption data according to various embodiments. FIG. 3 is for illustrative purposes, but an embodiment of the present invention is not limited thereto. For one example, an external server 106 may be a broadcast output device of a broadcasting station that sends out a broadcast, and a network 162 may include a satellite, a transmission tower, a radio frequency (RF) repeater, and the like, each transmitting a broadcast signal. For another example, the external server 106 may be a server that streams an image, and the network 162 may be a wireless communication network via a communication base station.

Referring to FIG. 3, the external server 106 may convert a plurality of image frames 301a to be transmitted into packets 302b of a specified format. The packets 302b may be data cut to a specified size after performing conversion (e.g., image processing, compression, and the like) of the plurality of image frames 301a. In various embodiments, the external server 106 may convert the plurality of image frames 310a into the packets 302b based on the real-time transport protocol (RTP).

In various embodiments, some of the packets 302b may include caption data 305. The caption data 305 may include information about a caption to be displayed in common on the plurality of image frames 301a.

In various embodiments, the packets 302b may include image data about a first frame to an Nth frame, audio data and caption data to be output together with the first frame to the Nth frame, and the like in their payload and may include information such as a temporal relationship between respective packets in their header.

In various embodiments, the caption data 305 may not be provided to be independent of image data about the first frame to the Nth frame and may be transmitted together with packets for transmitting the image data.

A communication interface 170 may receive the packets 302b including data (e.g., data that may include image data, audio data, and caption data) for outputting an image, over the network 162 from the external server 106. The communication interface 170 may provide the received packets 302b to a processor 120.

The processor 120 may combine the packets 302b and may perform conversion (e.g., image processing, decompression, and the like) of the combined packet to configure the plurality image frames 301a. The processor 120 may extract caption data from some of the packets 302b and may output a caption together with the plurality of image frames 301a.

According to various embodiments, the processor 120 may parse the caption and may determine whether link information matched with a specified data type (e.g., a URL pattern, a phone number pattern, an email address pattern, and the like) is included in the caption. If the link information is included in the caption, the processor 120 may display a connection object 360 on a specified location (e.g., a right edge of a screen).

According to various embodiments, the processor 120 may perform a parsing task and a link connection task while some (e.g., a 1st to 10th frames) of the plurality of image frames 301a are output and may output the connection object 360 if the related task is completed. In FIG. 3, the processor 120 may perform the parsing task and the link connection task while a frame 310 is output and may output the connection object 360 while a frame 320 and a frame 330 are output.

The processor 120 may not store many data for extracting link information and may quickly perform computation for extracting the link information by extracting the link information based on a specified data type (e.g., a URL address pattern, a phone number pattern, an email address pattern, and the like). Compared with a conventional keyword extraction method of extracting a keyword by connecting to a separate server, the processor 120 may quickly process data and may quickly provide information the user wants to access in a real-time broadcast.

According to various embodiments, if the user selects the connection object 360, a link may be activated or a related application may be directly executed. Additional information about executing link information may be provided with reference to FIGS. 4 to 7B.

Figure 4:
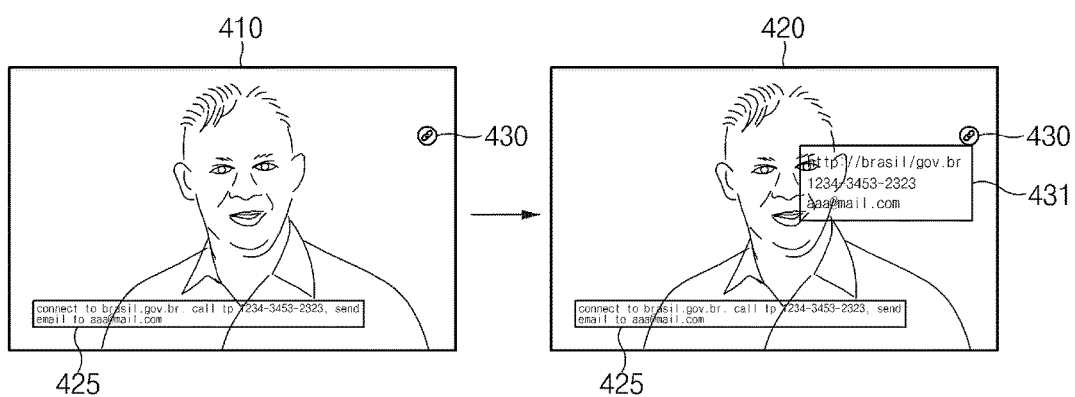
FIG. 4 illustrates a screen showing a process of outputting a list of link information according to various embodiments.

FIG. 4 illustrates a screen showing a process of outputting a list of link information according to various embodiments. FIG. 4 is for illustrative purposes, but embodiments of the present disclosure are not limited thereto.

Referring to FIG. 4, if link information (e.g., a URL address, a phone number, an email address, and the like) is included in a caption 425 in a first image frame 410 and a second image frame 420 that are sequentially output, a processor 120 of FIG. 1 may output a connection object 430 (e.g., a link button and an icon).

If a user of an electronic device 101 of FIG. 1 selects the connection object 430, for example, if he or she touches the connection object 430 or if he or she executes the connection object 430 using a remote controller, the processor 120 may parse a caption and may output a list 431 of extracted link information. If a plurality of link information is extracted during a specified time, the plurality of link information may be included in the list 431.

The list 431 may be output in a specified form not to interfere with viewing an image broadcasted in real time. For one example, the list 431 may be configured to fix a size of its window and to display a plurality of link information through a scroll mode. For another example, the list 431 may be output in the form of a transparent pop-up window.

According to various embodiments, the list 431 may be displayed on a region that does not hide an object on a screen or may be displayed in a form such as picture in picture (PIP) or picture by picture (PBP).

In FIG. 4, an embodiment of the present disclosure is exemplified as the connection object 430 and the list 431 are output on a right edge of a screen. However, embodiments of the present disclosure are not limited thereto. For example, the connection object 430 and the list 431 may be displayed on an edge region of a lower or upper end of a screen.

If the user selects one of items included in the list 431, a corresponding application may be executed. For example, if a URL is selected, a browser app may be executed. If a phone number is selected, a call app or a message app may be executed.

According to various embodiments, the connection object 430 or a related application may be output on a separate display distinguished from a display that outputs an image. For example, in an electronic device including a first display and a second display (e.g., a dual display electronic device), the image may be output on the first display, and the connection object 430 or the link information related application may be output on the second display.

According to various embodiments, the processor 120 may be configured to execute another function based on a pressure level of a touch input where the user pushes the connection object 430. For example, if the user pushes the connection object 430 (or one of the items included in the list 431) with a first pressure, a related application may be executed on a display 160 of the electronic device 101. If the user pushes the connection object 430 with a second pressure that is higher than the first pressure, a related application may be executed on a display of an external device (e.g., a smart watch, a television (TV), and the like) operatively connected with the electronic device 101.

If link information such as a URL address or a phone number is displayed on a caption while the user views a real-time broadcast or a streaming broadcast, he or she may verify related information in real time. The user may verify related information through a simple input without the necessity of writing a separate memo for link information or memorizing the link information.

According to various embodiments, if the user does not select the connection object 430 during a specified time, the processor 120 may remove the connection object 430 from a screen. If the connection object 430 is removed from the screen, the processor 120 may reset extracted link information or may move link information stored in a temporary buffer to a memory 130 of FIG. 2 to store the link information in the memory 130. After the user views all images, he or she may verify history of separately stored link information and may easily obtain information associated with the images after a real-time broadcast is ended.

According to various embodiments, the connection object 430 may be output using a caption output together with an image. For example, if link information such as a URL address or a phone number is displayed on a caption, the processor 120 may add an underline effect or a color change effect to the URL address or the phone number of the caption and may output the caption. If the user selects a corresponding portion of the caption, for example, if he or she touches the corresponding portion of the caption, a related application may be executed.

In various embodiments, the connection object 430 may be output together with a haptic feedback such as a sound or vibration. Also, the connection object 430 may be output in the form of previewing a list of related link information, through a hovering input and the like.

Figure 5:
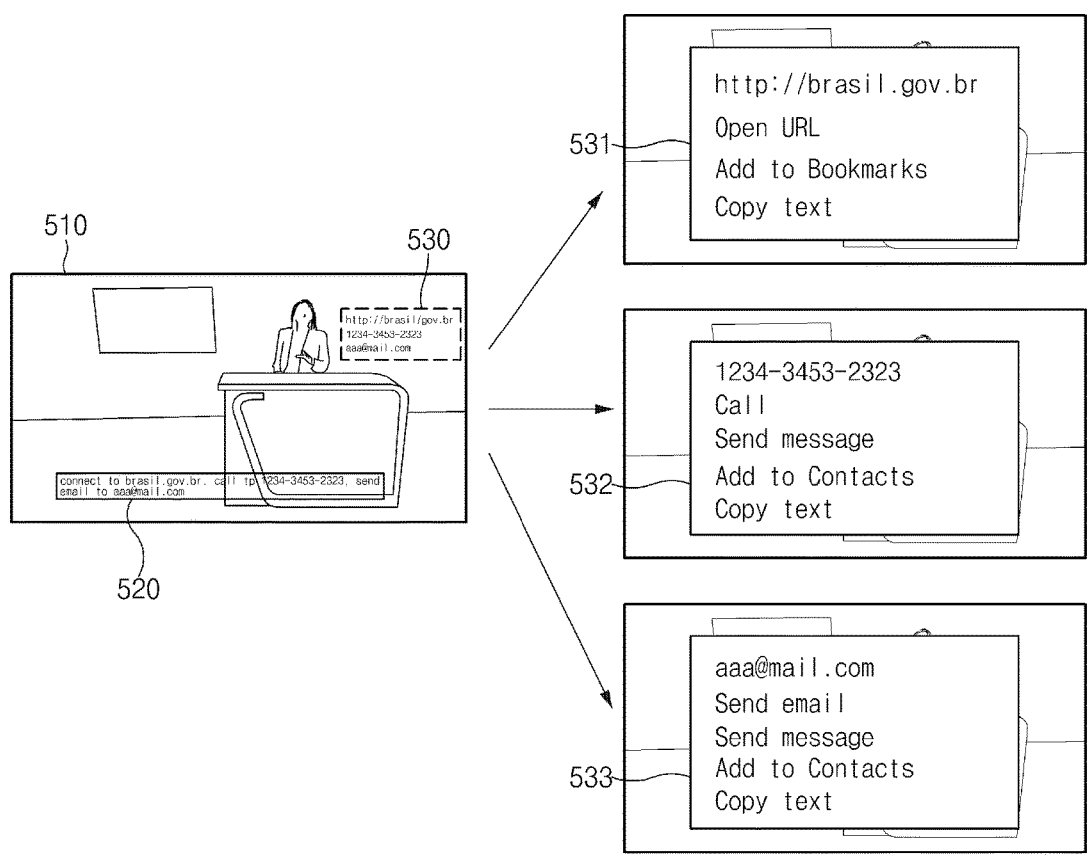
FIG. 5 illustrates a screen showing a process of directly displaying link information on a screen according to various embodiments.

FIG. 5 illustrates a screen showing a process of directly displaying link information on a screen according to various embodiments.

Referring to FIG. 5, a processor 120 of FIG. 1 may extract link information from a caption 520 output together with an image 510. The processor 120 may output a link list 530, while the image 510 is output. The processor 120 may not output a connection object of an icon form to be distinguished from FIG. 4 and may directly output the link list 530, indicating link information, as a connection object. If a user of an electronic device 101 of FIG. 1 selects one of items included in the link list 530, the processor 120 may output different execution lists (or different selection lists) based on attributes of the selected link information.

For example, if the user selects link information of URL attributes, the processor 120 may output an execution list 531 associated with a URL. The execution list 531 may include items such as a webpage connection based on a URL address, the addition of bookmarks to the URL address, and a text copy. If the user selects one of items included the execution list 531, the processor 120 may execute a related application (e.g., a browser app). In various embodiments, the execution list 531 may include an item shared with a social networking service (SNS) app such as Facebook and Twitter.

For another example, if the user selects link information of phone number attributes, the processor 120 may output an execution list 532 associated with a phone number. The execution list 532 may include items such as a call connection, message sending, the addition of contacts, and a text copy. If the user selects one of items included in the execution list 532, the processor 120 may execute a related application (e.g., a call app, a message app, and a contacts app).

For another example, if the user selects link information of email attributes, the processor 120 may display an execution list 533 including items such as email sending, message sending, the addition of contacts, and a text copy.

According to various embodiments, the execution list 532 may include a shortcut icon of an application associated with each item of link information. For example, if link information is a phone number, a phone icon may be included in the execution list 532. If link information is an email, an email icon may be included in the execution list 532.

FIG. 5 is for illustrative purposes, but embodiments of the present disclosure are not limited thereto. The execution lists 531 to 533 may be executed in various output manners (e.g., a transparent window), and an item of each of the execution lists 531 to 533 may be changed.

Figure 6:
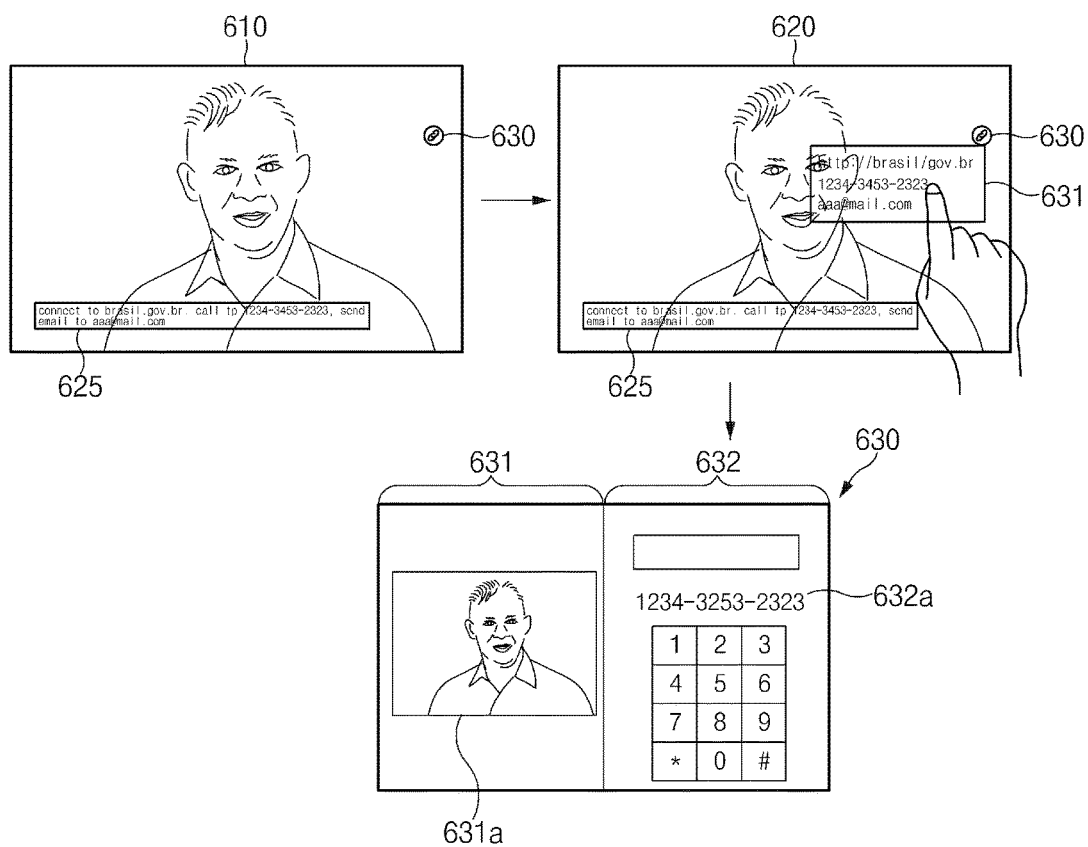
FIG. 6 illustrates a screen showing a process that provides additional information according to various embodiments.

FIG. 6 illustrates a screen showing a process that provides additional information according to various embodiments.

Referring to FIG. 6, a processor 120 of FIG. 1 may extract link information from a caption 625 output together with a first image frame 610 and a second image frame 620. The processor 120 may output a connection object 630, while the first image frame 610 and the second image frame 620 are output.

If a user of an electronic device 101 of FIG. 1 selects the connection object 630, the processor 120 may output a list 631 of link information extracted after parsing the caption 625. If a plurality of link information is extracted during a specified time, the plurality of link information may be included in the list 631.

If the user selects one of items included in the list 631, the processor 120 may output a corresponding application on at least part of a display 160 of FIG. 1. According to various embodiments, the processor 120 may continue outputting a real-time image on a first region 631 using a multi-window and may execute an application associated with link information selected by the user on a second region 632. The user may execute an application associated with link information 632a through the second region 632 and may simultaneously continue viewing an image 631a through the first region 631.

In FIG. 6, an embodiment of the present disclosure is exemplified as the user selects a phone number. However, embodiments of the present disclosure are not limited thereto. For example, if the user selects a URL address, the processor 120 may execute a browser app. If the user selects an email, the processor 120 may output an email writing screen on the second region 632.

Figure 7A:
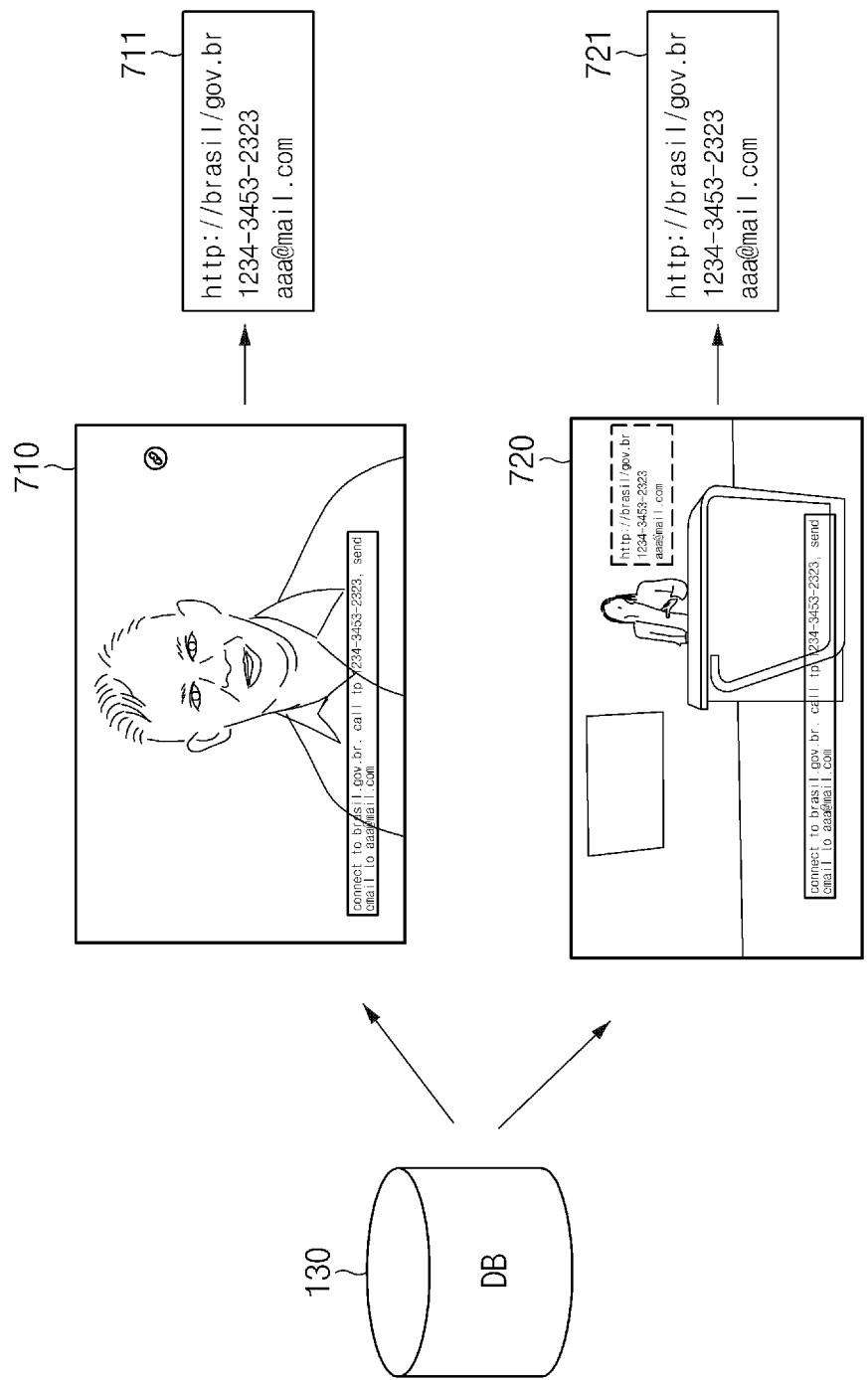
FIG. 7A illustrates a drawing of a process of storing a capture image of a screen that displays link information according to various embodiments.

FIG. 7A illustrates a drawing showing a process of storing a capture image of a screen that displays link information according to various embodiments.

Referring to FIG. 7A, if link information is included in a caption, a processor 120 of FIG. 1 may extract the link information from the caption and may store the extracted link information in a memory 130 (e.g., a database (DB)). If a user of an electronic device 101 of FIG. 1 wants to verify history of link information output through the caption while he or she views a real-time image (or a streaming image), for example, if he or she selects a history item included in an execution list, the processor 120 may provide history of link information stored in the memory 130. In various embodiments, the memory 130 may be configured to store link information during a specified time (e.g., 15 minutes) or to store link information until a streamed image is ended.

According to various embodiments, the processor 120 may store link information and an image (e.g., a caption image 710 or 720), where a screen that displays the link information is captured, in the memory 130. The user may easily memorize a screen including link information he or she wants to search for, through the caption image 710 or 720.

If the user selects the caption image 710 or 720, the processor 120 may output a list 711 or 721 including link information included in the selected caption image 710 or 720. The user may verify the link information included in the list 711 or 721, may select necessary link information, and may execute a related application.

Figure 7B:
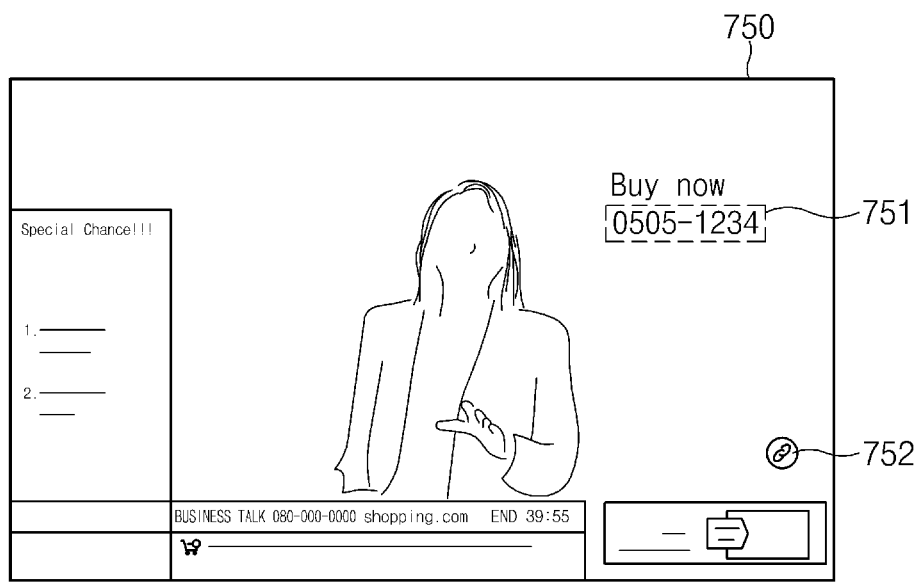
FIG. 7B illustrates a screen showing a process of extracting link information through voice recognition or image recognition according to various embodiments.

FIG. 7B illustrates a screen showing a process of extracting link information through voice recognition or image recognition according to various embodiments. FIG. 7B is for illustrative purposes, but embodiments of the present disclosure are not limited thereto.

Referring to FIG. 7B, a processor 120 of FIG. 1 may extract link information from various types of captions output together with an image 750 and may provide the extracted link information to a user of an electronic device 101 of FIG. 1. In one example, the processor 120 may receive and output only image data without receiving separate caption data from an external device (e.g., a server 106 of FIG. 1) or may extract link information through image processing if a caption is provided by integrating with an image that configures image data.

For example, a caption 751 or 752 may be provided by integrating with the image 750 shown in FIG. 7B without being provided as data independent of the image 750. The processor 120 may process image data as an image and may extract the caption 751 or 752 from the image. For example, the processor 120 may extract the caption 751 or 752 using an image processing method applied to optical character recognition (OCR).

The processor 120 may parse the caption 751 or 752 and may extract link information such as a URL address and a phone number from the caption 751 or 752. If the link information is extracted, the processor 120 may output a connection object 753. If the user selects the connection object 753, the processor 120 may display related information on a screen of the electronic device 101.

According to various embodiments, the processor 120 may extract link information using audio data provided together with image data. For example, the processor 120 may analyze audio data using a speech to text (STT) technology and may extract link information by matching the analyzed text with a specified data type. If there is linked link information, the processor 120 may output a connection object on a screen of the electronic device 101 to allow the user to verify the link information if necessary.

Figure 8:
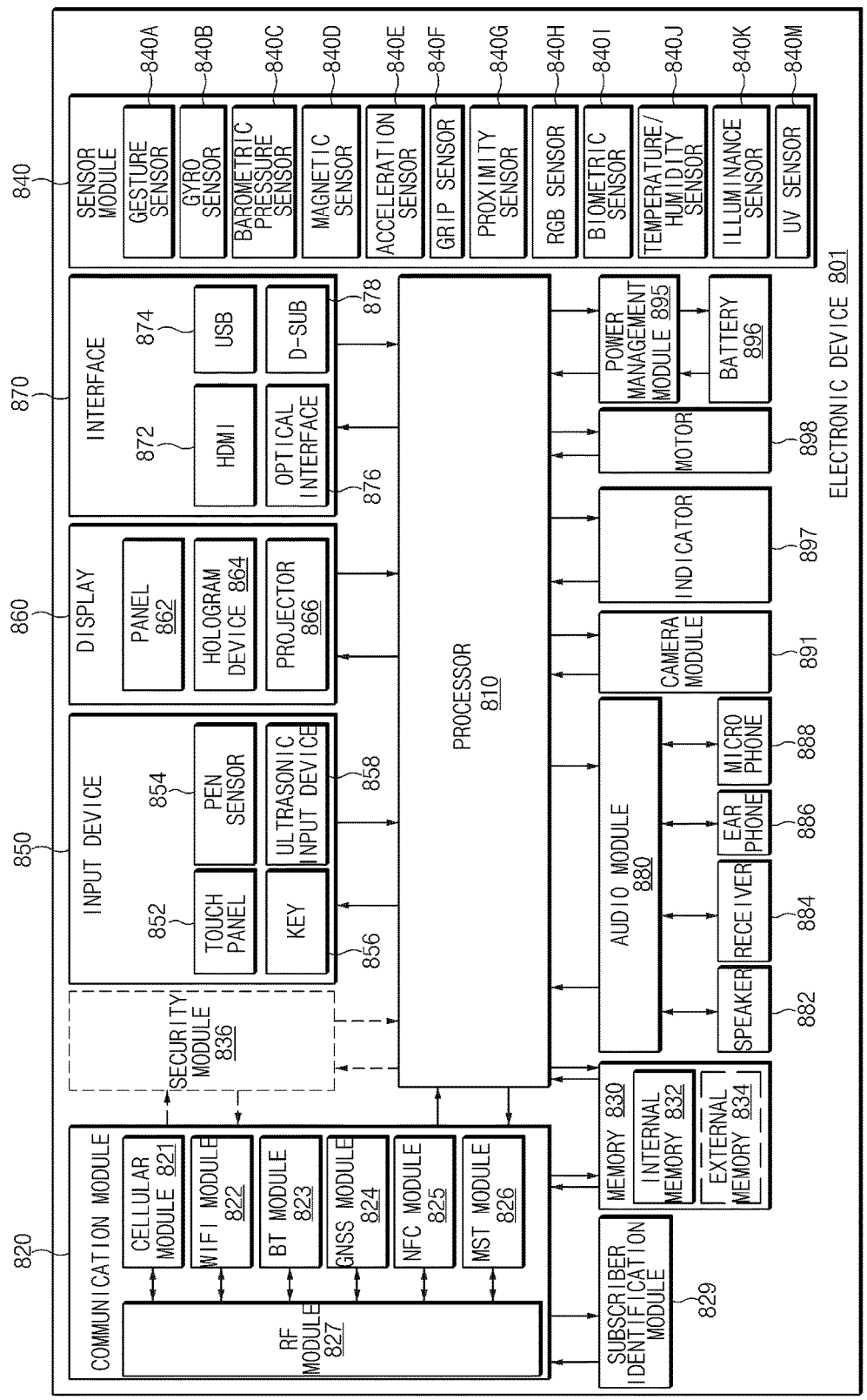
FIG. 8 illustrates a block diagram showing a configuration of an electronic device according to various embodiments.

FIG. 8 illustrates a block diagram showing a configuration of an electronic device according to various embodiments. An electronic device 801 may include, for example, all or a part of the electronic device 81 illustrated in FIG. 1. The electronic device 801 may include one or more processors (e.g., an application processor (AP)) 810, a communication module 820, a subscriber identification module 824, a memory 830, a sensor module 840, an input device 850, a display 860, an interface 870, an audio module 880, a camera module 891, a power management module 895, a battery 896, an indicator 897, and a motor 898.

The processor 810 may drive an operating system (OS) or an application to control a plurality of hardware or software elements connected to the processor 810 and may process and compute a variety of data. The processor 810 may be implemented with a System on Chip (SoC), for example. According to an embodiment, the processor 810 may further include a graphic processing unit (GPU) and/or an image signal processor. The processor 810 may include at least a part (e.g., a cellular module 821) of elements illustrated in FIG. 8. The processor 810 may load and process an instruction or data, which is received from at least one of other elements (e.g., a nonvolatile memory) and may store a variety of data in a nonvolatile memory.

The communication module 820 may be configured the same as or similar to the communication interface 170 of FIG. 1. The communication module 820 may include a cellular module 821, a Wi-Fi module 823, a Bluetooth (BT) module 825, a GNSS module 827 (e.g., a GPS module, a Glonass module, a Beidou module, or a Galileo module), a near field communication (NFC) module 828, and a radio frequency (RF) module 829.

The cellular module 821 may provide voice communication, video communication, a message service, an Internet service or the like through a communication network. According to an embodiment, the cellular module 821 may perform discrimination and authentication of the electronic device 801 within a communication network using the subscriber identification module 824 (e.g., a SIM card), for example. According to an embodiment, the cellular module 821 may perform at least a portion of functions that the processor 810 provides. According to an embodiment, the cellular module 821 may include a communication processor (CP).

Each of the Wi-Fi module 823, the BT module 825, the GNSS module 827, and the NFC module 828 may include a processor for processing data exchanged through a corresponding module, for example. According to an embodiment, at least a part (e.g., two or more elements) of the cellular module 821, the Wi-Fi module 823, the BT module 825, the GNSS module 827, or the NFC module 828 may be included within one Integrated Circuit (IC) or an IC package.

The RF module 829 may transmit and receive, for example, a communication signal (e.g., an RF signal). The RF module 829 may include, for example, a transceiver, a power amplifier module (PAM), a frequency filter, a low noise amplifier (LNA), an antenna, or the like. According to another embodiment, at least one of the cellular module 821, the Wi-Fi module 823, the BT module 825, the GNSS module 827, or the NFC module 828 may transmit and receive an RF signal through a separate RF module.

The subscriber identification module 824 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 830 (e.g., the memory 130) may include an internal memory 832 or an external memory 834. For example, the internal memory 832 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, or a NOR flash memory), a hard drive, or a solid state drive (SSD).

The external memory 834 may include a flash drive, for example, compact flash (CF), secure digital (SD), micro secure digital (Micro-SD), mini secure digital (Mini-SD), extreme digital (xD), multimedia card (MMC), a memory stick, or the like. The external memory 834 may be functionally and/or physically connected with the electronic device 801 through various interfaces.

The sensor module 840 may measure, for example, a physical quantity or may detect an operation state of the electronic device 801. The sensor module 840 may convert the measured or detected information to an electric signal. The sensor module 840 may include at least one of a gesture sensor 840A, a gyro sensor 840B, a barometric pressure sensor 840C, a magnetic sensor 840D, an acceleration sensor 840E, a grip sensor 840F, a proximity sensor 840G, a color sensor 840H (e.g., red, green, blue (RGB) sensor), a biometric sensor 840I, a temperature/humidity sensor 840J, an illuminance sensor 840K, or an UV sensor 840M. Even though not illustrated, additionally or alternatively, the sensor module 840 may include, for example, an E-nose sensor, an electromyography sensor (EMG) sensor, an electroencephalogram (EEG) sensor, an electrocardiogram (ECG) sensor, an infrared (IR) sensor, an iris sensor, and/or a fingerprint sensor. The sensor module 840 may further include a control circuit for controlling at least one or more sensors included therein. According to an embodiment, the electronic device 801 may further include a processor that is a part of the processor 810 or independent of the processor 810 and is configured to control the sensor module 840. The processor may control the sensor module 840 while the processor 810 remains at a sleep state.

The input device 850 may include, for example, a touch panel 852, a (digital) pen sensor 854, a key 856, or an ultrasonic input unit 858. The touch panel 852 may use at least one of capacitive, resistive, infrared and ultrasonic detecting methods. Also, the touch panel 852 may further include a control circuit. The touch panel 852 may further include a tactile layer to provide a tactile reaction to a user.

The (digital) pen sensor 854 may be, for example, a portion of a touch panel or may include an additional sheet for recognition. The key 856 may include, for example, a physical button, an optical key, a keypad, or the like. The ultrasonic input device 858 may detect (or sense) an ultrasonic signal, which is generated from an input device, through a microphone (e.g., a microphone 888) and may check data corresponding to the detected ultrasonic signal.

The display 860 (e.g., the display 160) may include a panel 862, a hologram device 864, or a projector 866. The panel 862 may be configured the same as or similar to the display 160 of FIG. 1. The panel 862 may be implemented to be flexible, transparent or wearable, for example. The panel 862 and the touch panel 852 may be integrated into a single module. The hologram device 864 may display a stereoscopic image in a space using a light interference phenomenon. The projector 866 may project light onto a screen so as to display an image. The screen may be arranged inside or outside the electronic device 801. According to an embodiment, the display 860 may further include a control circuit for controlling the panel 862, the hologram device 864, or the projector 866.

The interface 870 may include, for example, a high-definition multimedia interface (HDMI) 872, a universal serial bus (USB) 874, an optical interface 876, or a D-sub-miniature (D-sub) 878. The interface 870 may be included, for example, in the communication interface 170 illustrated in FIG. 1. Additionally or alternatively, the interface 870 may include, for example, a mobile high definition link (MHL) interface, a SD card/multi-media card (MMC) interface, or an infrared data association (IrDA) standard interface.

The audio module 880 may convert a sound and an electrical signal in dual directions. At least a part of the audio module 880 may be included, for example, in the input/output interface 150 illustrated in FIG. 1. The audio module 880 may process, for example, sound information that is input or output through a speaker 882, a receiver 884, an earphone 886, or a microphone 888.

The camera module 891 for shooting a still image or a video may include, for example, at least one image sensor (e.g., a front sensor or a rear sensor), a lens, an image signal processor (ISP), or a flash (e.g., an LED or a xenon lamp).

The power management module 895 may manage, for example, power of the electronic device 801. According to an embodiment, a power management integrated circuit (PMIC) a charger IC, or a battery or fuel gauge may be included in the power management module 895. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 896 and a voltage, current or temperature thereof while the battery is charged. The battery 896 may include, for example, a rechargeable battery or a solar battery.

The indicator 897 may display a specific state of the electronic device 801 or a part thereof (e.g., the processor 810), such as a booting state, a message state, a charging state, and the like. The motor 898 may convert an electrical signal into a mechanical vibration and may generate a vibration effect, a haptic effect, or the like. Even though not illustrated, a processing device (e.g., a GPU) for supporting a mobile TV may be included in the electronic device 801. The processing device for supporting a mobile TV may process media data according to the standards of digital multimedia broadcasting (DMB), digital video broadcasting (DVB), MediaFlo™, or the like.

Each of the above-mentioned elements may be configured with one or more components, and the names of the elements may be changed according to the type of the electronic device. The electronic device according to various embodiments may include at least one of the above-mentioned elements, and some elements may be omitted or other additional elements may be added. Furthermore, some of the elements of the electronic device according to various embodiments may be combined with each other so as to form one entity, such that the functions of the elements may be performed in the same manner as before the combination.

Figure 9:
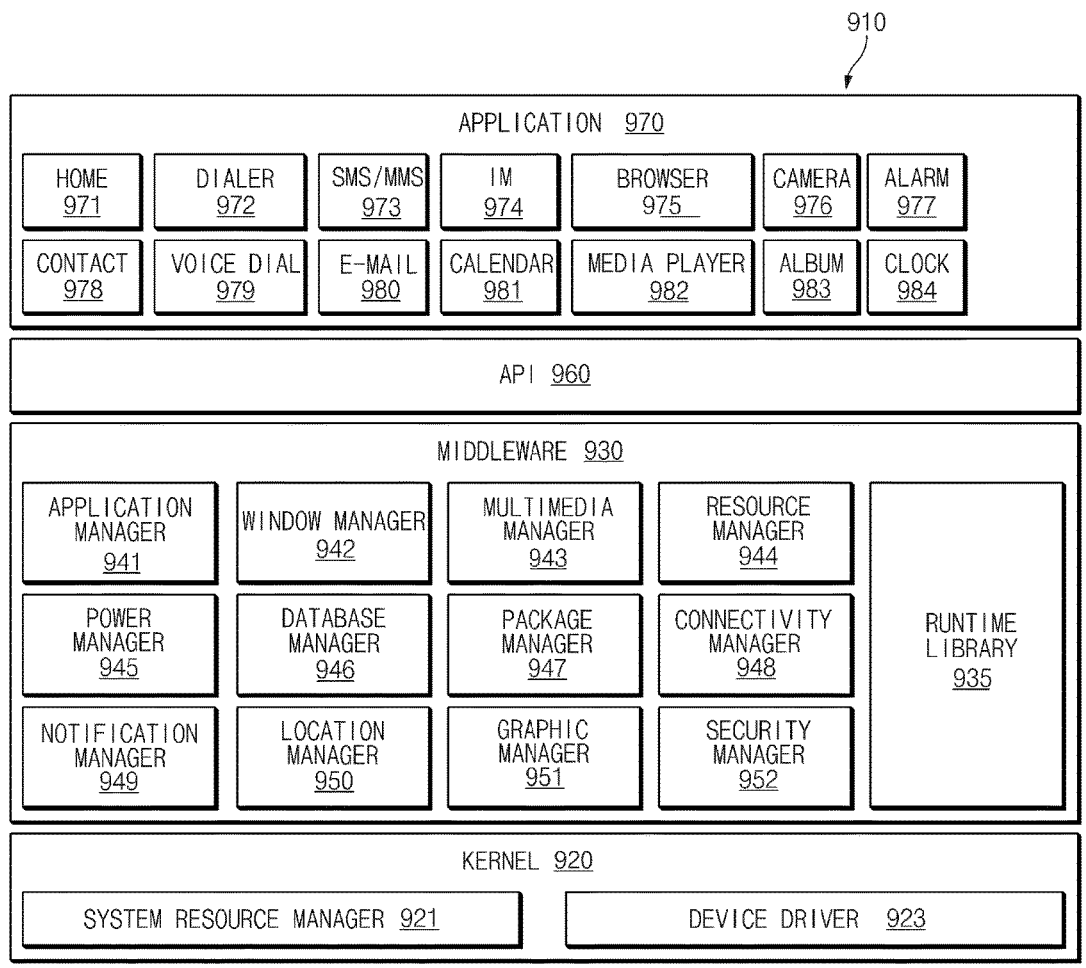
FIG. 9 illustrates a block diagram showing a configuration of a program module according to various embodiments.

FIG. 9 illustrates a block diagram showing a configuration of a program module according to various embodiments. According to an embodiment, a program module 910 (e.g., the program 140) may include an operating system (OS) to control resources associated with an electronic device (e.g., the electronic device 101) and/or diverse applications (e.g., the application program 147) driven on the OS. The OS may be, for example, Android®, iOS®, Windows®, Symbian®, Tizen®, or Bada®.

The program module 910 may include a kernel 920, a middleware 930, an application programming interface (API) 960, and/or an application 970. At least a part of the program module 910 may be preloaded on an electronic device or may be downloadable from an external electronic device (e.g., the external device 102, and the like).

The kernel 920 (e.g., the kernel 141) may include, for example, a system resource manager 921 and/or a device driver 923. The system resource manager 921 may perform control, allocation, or retrieval of system resources. According to an embodiment, the system resource manager 921 may include a process managing part, a memory managing part, or a file system managing part. The device driver 923 may include, for example, a display driver, a camera driver, a Bluetooth driver, a shared memory driver, an USB driver, a keypad driver, a Wi-Fi driver, an audio driver, or an inter-process communication (IPC) driver.

The middleware 930 may provide, for example, a function that the application 970 uses in common, or may provide diverse functions to the application 970 through the API 960 to allow the application 970 to efficiently use limited system resources of the electronic device. According to an embodiment, the middleware 930 (e.g., the middleware 143) may include at least one of a runtime library 935, an application manager 941, a window manager 942, a multimedia manager 943, a resource manager 944, a power manager 945, a database manager 946, a package manager 947, a connectivity manager 948, a notification manager 949, a location manager 950, a graphic manager 951, or a security manager 952.

The runtime library 935 may include, for example, a library module that is used by a compiler to add a new function through a programming language while the application 970 is being executed. The runtime library 935 may perform input/output management, memory management, or capacities about arithmetic functions.

The application manager 941 may manage, for example, a life cycle of at least one application of the application 970. The window manager 942 may manage a GUI resource that is used in a screen. The multimedia manager 943 may identify a format necessary for playing diverse media files and may perform encoding or decoding of media files by using a codec suitable for the format. The resource manager 944 may manage resources such as a storage space, memory, or source code of at least one application of the application 970.

The power manager 945 may operate, for example, with a basic input/output system (BIOS) to manage a battery or power and may provide power information for an operation of an electronic device. The database manager 946 may generate, search for, or modify database that is to be used in at least one application of the application 970. The package manager 947 may install or update an application that is distributed in the form of a package file.

The connectivity manager 948 may manage, for example, wireless connection such as Wi-Fi or Bluetooth. The notification manager 949 may display or notify an event such as arrival message, appointment, or proximity notification in a mode that does not disturb a user. The location manager 950 may manage location information of an electronic device. The graphic manager 951 may manage a graphic effect that is provided to a user or manage a user interface relevant thereto. The security manager 952 may provide a general security function necessary for system security or user authentication. According to an embodiment, when an electronic device (e.g., the electronic device 101) includes a telephony function, the middleware 930 may further includes a telephony manager for managing a voice or video call function of the electronic device.

The middleware 930 may include a middleware module that combines diverse functions of the above-described elements. The middleware 930 may provide a module specialized to each OS kind to provide differentiated functions. Additionally, the middleware 930 may remove a part of the preexisting elements, dynamically, or may add a new element thereto.

The API 960 (e.g., the API 145) may be, for example, a set of programming functions and may be provided with a configuration that is variable depending on an OS. For example, when an OS is Android® or iOS®, it may be permissible to provide one API set per platform. When an OS is Tizen®, it may be permissible to provide two or more API sets per platform.

The application 970 (e.g., the application program 147) may include, for example, one or more applications capable of providing functions for a home 971, a dialer 972, an SMS/MMS 973, an instant message (IM) 974, a browser 975, a camera 976, an alarm 977, a contact 978, a voice dial 979, an e-mail 980, a calendar 981, a media player 982, an album 983, and a clock 984, or for offering health care (e.g., measuring an exercise quantity or blood sugar) or environment information (e.g., atmospheric pressure, humidity, or temperature).

According to an embodiment, the application 970 may include an application (hereinafter referred to as "information exchanging application" for descriptive convenience) to support information exchange between the electronic device (e.g., the electronic device 101) and an external electronic device (e.g., the electronic device 102 or 104). The information exchanging application may include, for example, a notification relay application for transmitting specific information to the external electronic device, or a device management application for managing the external electronic device.

For example, the notification relay application may include a function of transmitting notification information, which arise from other applications (e.g., applications for SMS/MMS, e-mail, health care, or environmental information), to an external electronic device (e.g., the electronic device 102 or 104). Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of an external electronic device (e.g., the electronic device 102) that communicates with the electronic device, an application running in the external electronic device, or a service (e.g., a call service, a message service, or the like) provided from the external electronic device.

According to an embodiment, the application 970 may include an application (e.g., a health care application of a mobile medical device, and the like) that is assigned in accordance with an attribute of the external electronic device (e.g., the electronic device 102). According to an embodiment, the application 970 may include an application that is received from an external electronic device (e.g., the electronic device 102). According to an embodiment, the application 970 may include a preloaded application or a third party application that is downloadable from a server. The element titles of the program module 910 according to the embodiment may be modifiable depending on kinds of OSs.

According to various embodiments, at least a part of the program module 910 may be implemented by software, firmware, hardware, or a combination of two or more thereof. At least a portion of the program module 910 may be implemented (e.g., executed), for example, by the processor (e.g., the processor 110). At least a portion of the program module 910 may include, for example, a module, a program, a routine, sets of instructions, or a process for performing one or more functions.

According to various embodiments, an electronic device may include a memory, a communication interface configured to perform data communication with an external device, a display configured to output an image under control of the processor and a processor configured to electrically connect with the memory, the communication interface, and the display, wherein the communication interface is configured to receive image data for a plurality of image frames and caption data linked with the plurality of image frames, and wherein the processor is configured to: parse the caption data and extract link information according to a data type from the caption data and output a connection object or a list for verifying the link information, while the plurality of image frames are output on the display.

According to an embodiment, the plurality of image frames configures a partial subsequent interval in one image of the same attributes. According to various embodiments, the plurality of image frames configures at least part of a streaming file for one image.

According to various embodiments, the communication interface receives a plurality of packets including the image data and the caption data, and the processor extracts the caption data from at least some of the plurality of packets.

According to various embodiments, the memory stores the link information, and the processor stores history including time information about the link information in the memory.

The term "module" used in this disclosure may represent, for example, a unit including one or more combinations of hardware, software and firmware. For example, the term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a portion of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 120), may cause the one or more processors to perform a function corresponding to the instruction. The computer-readable storage media, for example, may be the memory 130.

The computer-readable storage media according to various embodiments may store a program for executing an operation in which a communication module receives an application package from an external device and provides the application package to a normal module of a processor, an operation in which the normal module determines whether a secure application is included in at least a portion of the application package, and an operation in which the secure module of the processor installs the secure application in the secure module or in a memory associated with the secure module.

The computer-readable storage media may include a hard disk, a floppy disk, a magnetic media (e.g., a magnetic tape), an optical media (e.g., a compact disc read only memory (CD-ROM) and a digital versatile disc (DVD)), a magneto-optical media (e.g., a floptical disk), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above-mentioned hardware devices may be configured to operate as one or more software modules to perform operations according to various embodiments, and vice versa.

Modules or program modules according to various embodiments may include at least one or more of the above-mentioned elements, some of the above-mentioned elements may be omitted, or other additional elements may be further included therein. Operations executed by modules, program modules, or other elements according to various embodiments may be executed by a successive method, a parallel method, a repeated method, or a heuristic method. Also, a part of operations may be executed in different sequences, omitted, or other operations may be added.

According to various embodiments, if there is information the user wants to access in a real-time broadcast or a streaming broadcast, the electronic device may allow him or her to verify the corresponding information through a simple touch input or a simple button input.

According to various embodiments, the electronic device may extract a URL address, a phone number, an email address, and the like in a real-time broadcast and may execute a related application.

According to various embodiments, the electronic device may provide a quick connection between the user and a broadcast service provider, and may efficiently provide information associated with a broadcast in real time to him or her, and may provide an advertisement associated with the broadcast to him or her.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An image output method performed in an electronic device, the method comprising:
   receiving image data for a plurality of image frames and caption data linked with the plurality of image frames;
   parsing the caption data to extract link information according to a data type from the caption data; and
   outputting a connection object or a list, for displaying the link information, on a display of the electronic device, while the plurality of image frames and captions are output on the display of the electronic device,
   wherein the captions are based on the caption data.

2. The method of claim 1, wherein the receiving of the image data and the caption data comprises:
   receiving the image data for the plurality of image frames that configures a partial subsequent interval in one image of same attributes.

3. The method of claim 1, wherein the receiving of the image data and the caption data comprises:
   receiving the image data for a plurality of image frames that configures at least part of a streaming file for one image.

4. The method of claim 1, wherein the receiving of the image data and the caption data comprises:
   receiving a plurality of packets including the image data and the caption data; and
   extracting the caption data from at least some of the plurality of packets.

5. The method of claim 1, wherein the parsing the caption data to extract the link information comprises:
   storing the link information in a buffer that maintains stored data during a period of time.

6. The method of claim 1, wherein the parsing the caption data to extract the link information comprises:
   storing the link information in a memory of the electronic device; and
   storing a history comprising time information about the link information.

7. The method of claim 1, wherein the parsing the caption data to extract the link information comprises:
   extracting the link information based on a data type corresponding to at least one of a uniform resource locator (URL), a phone number, or an electronic mail (email).

8. The method of claim 1, wherein the outputting of the connection object comprises:
   outputting text indicating the link information as the connection object.

9. The method of claim 1, wherein the outputting of the connection object comprises:
   outputting a link button or an icon to output a list of the extracted link information as the connection object.

10. The method of claim 1, wherein the outputting of the connection object comprises:
    outputting the connection object after an image frame among the plurality of image frames.

11. The method of claim 1, wherein the outputting of the connection object comprises:
    outputting the connection object on at least one of the display of the electronic device or a display of an external device that operates with the electronic device.

12. The method of claim 1, further comprising:
    outputting a list of the link information on at least part of the display if the connection object is selected.

13. The method of claim 12, wherein the outputting of the list of the link information comprises:
    executing an application associated with the link information if link information included in the list is selected.

14. The method of claim 13, wherein the executing of the application comprises:
    continuing outputting an image by the plurality of image frames on a first region of the display; and
    outputting an execution screen of the application on a second region of the display.

15. The method of claim 1, wherein the extracting of the link information comprises:
    processing at least some of the plurality of image frames as an image and extracting text of a data type from the image; and
    parsing the text to extract the link information from the text.

16. An electronic device, comprising:
    a memory;
    a communication interface configured to:
      perform data communication with an external device, and
      receive image data for a plurality of image frames and caption data linked with the plurality of image frames;
    a display configured to output an image under control of a processor; and
    the processor configured to electrically connect with the memory, the communication interface, and the display, wherein the processor is configured to:
      parse the caption data and extract link information according to a data type from the caption data, and output a connection object or a list for displaying the link information on the display, the plurality of image frames and captions are output on the display, wherein the captions are based on the caption data.

17. The electronic device of claim 16, wherein the plurality of image frames configures a partial subsequent interval in one image of same attributes.

18. The electronic device of claim 16, wherein the plurality of image frames configures at least part of a streaming file for one image.

19. The electronic device of claim 16, wherein the communication interface is configured to receive a plurality of packets including the image data and the caption data, and
wherein the processor is configured to extract the caption data from at least some of the plurality of packets.

20. The electronic device of claim 16, wherein the memory is configured to store the link information, and
wherein the processor is configured to store history including time information about the link information in the memory.

* * * * *